Feb. 19, 1957 J. C. MILLER 2,782,076
TRACTION DEVICE
Filed July 17, 1951 7 Sheets-Sheet 1
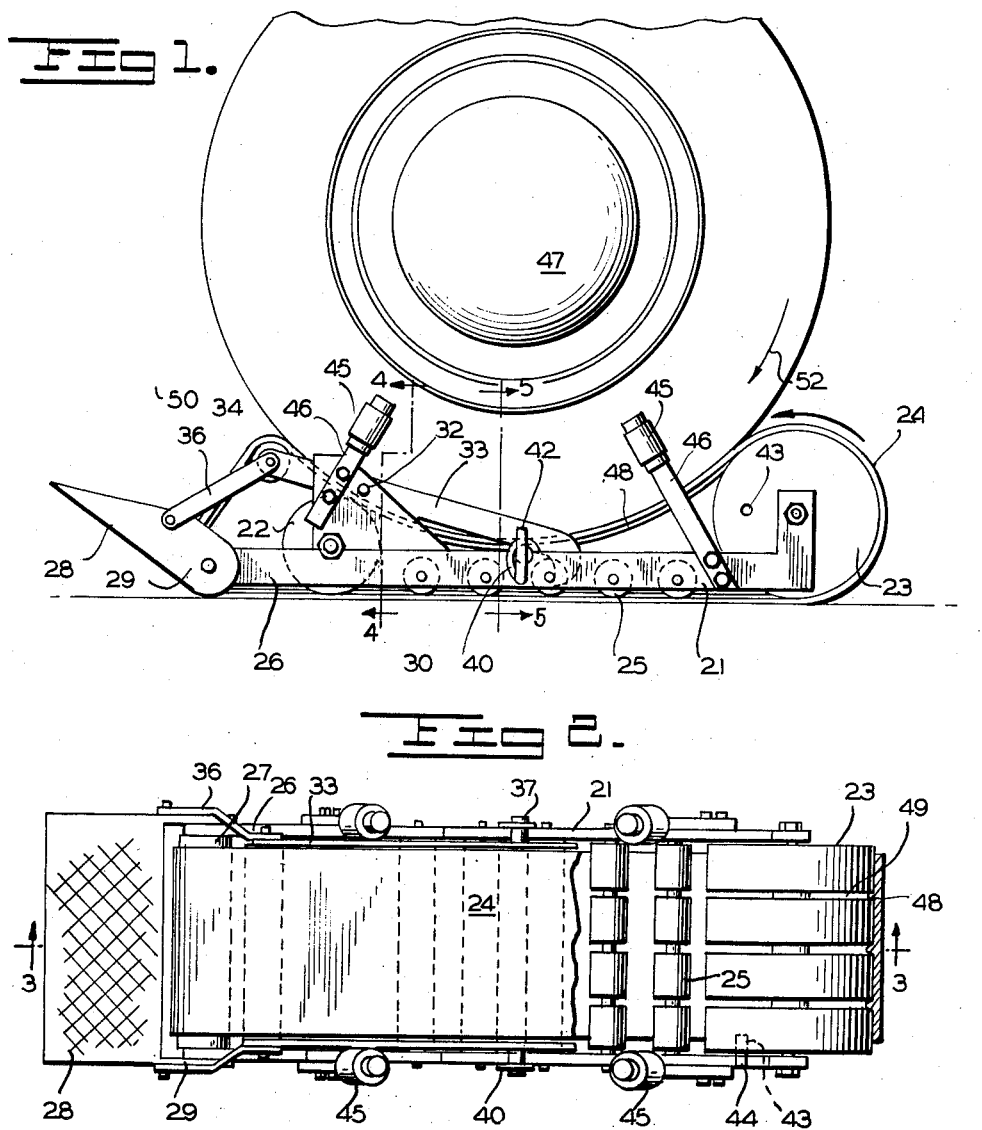
INVENTOR
John C. Miller
BY Cushman, Darby & Cushman
ATTORNEY

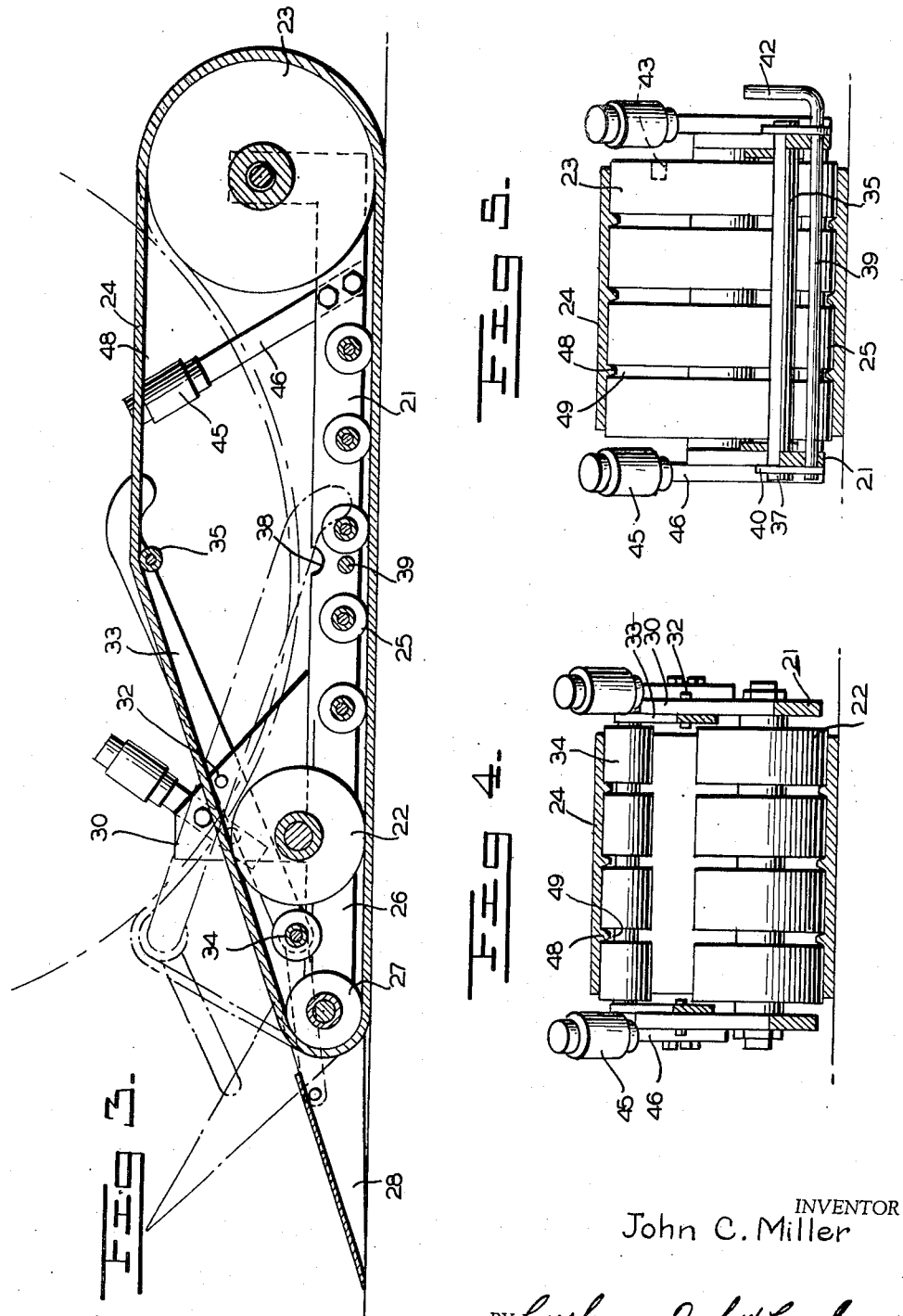

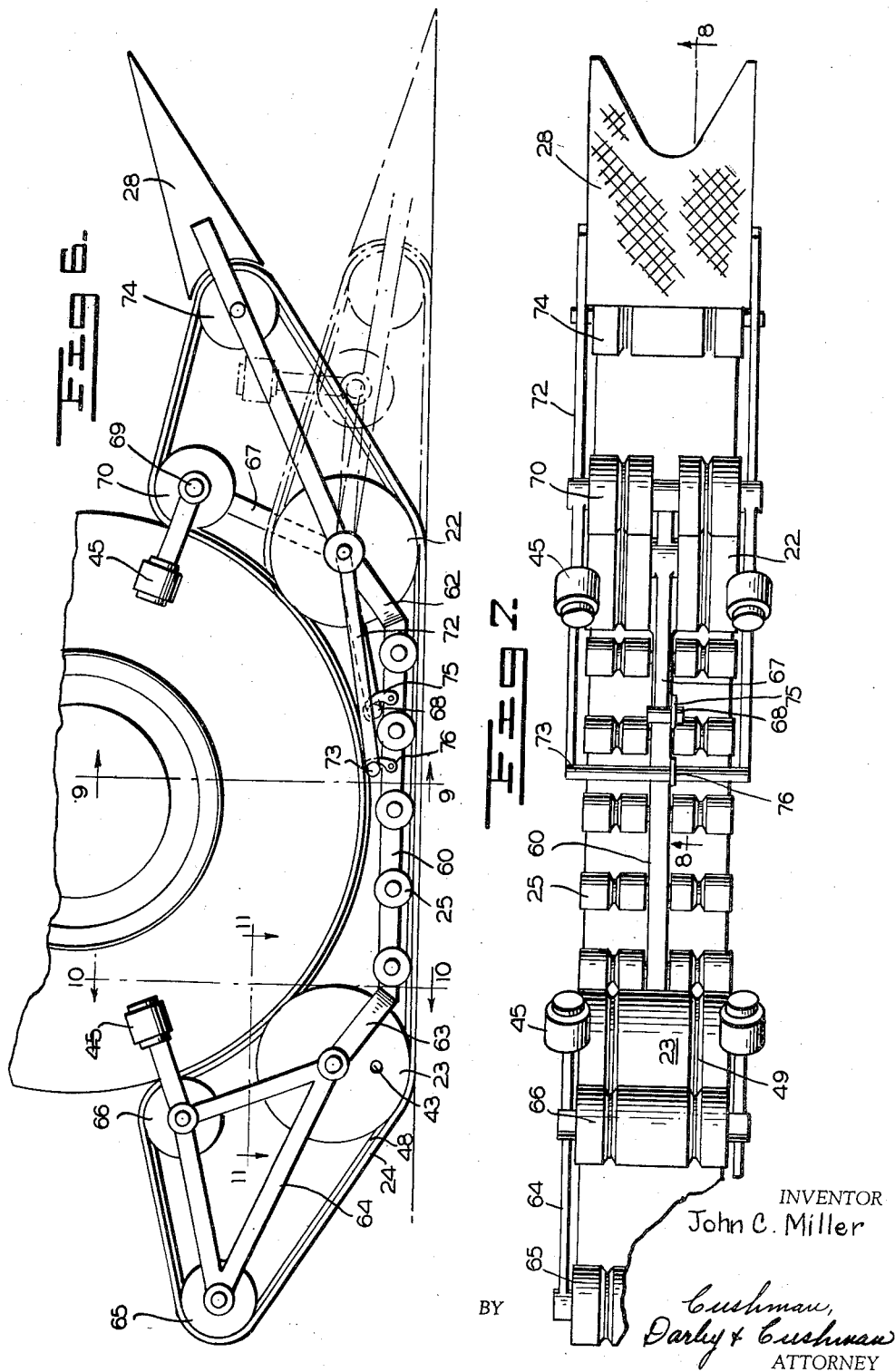

Feb. 19, 1957 J. C. MILLER 2,782,076
TRACTION DEVICE
Filed July 17, 1951 7 Sheets-Sheet 4
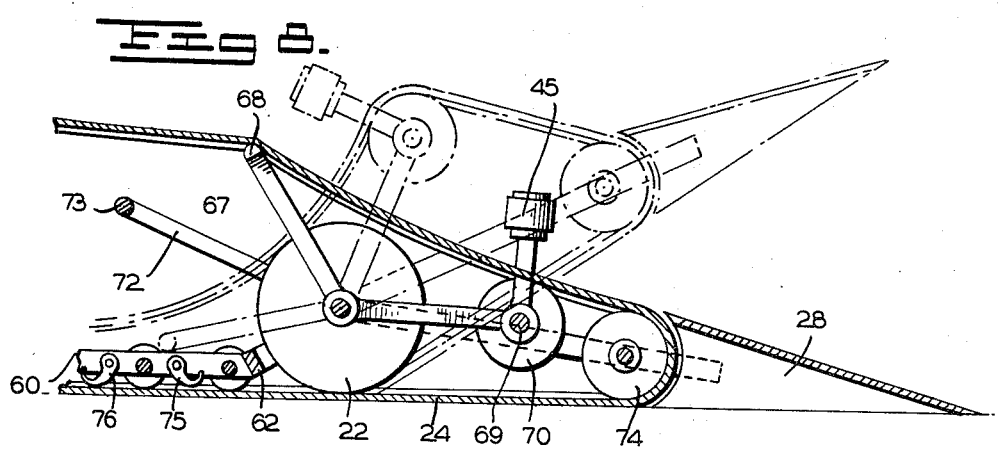
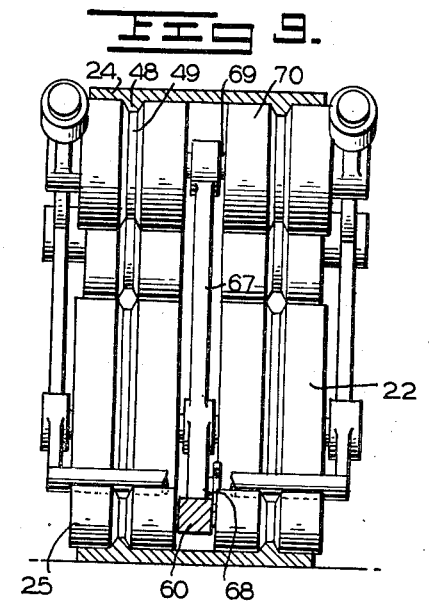
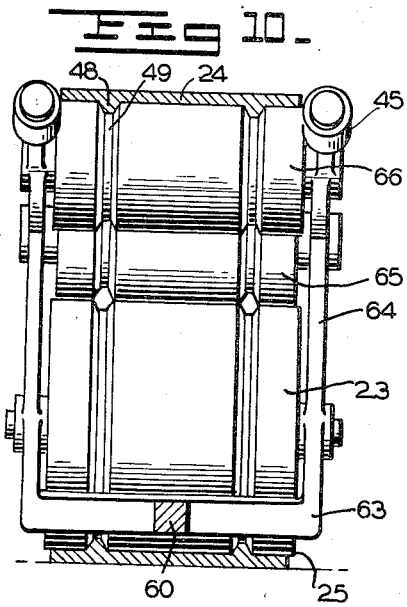
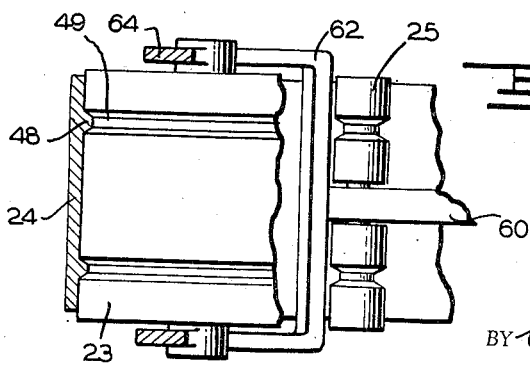
INVENTOR
John C. Miller
BY Cushman, Darby & Cushman
ATTORNEY

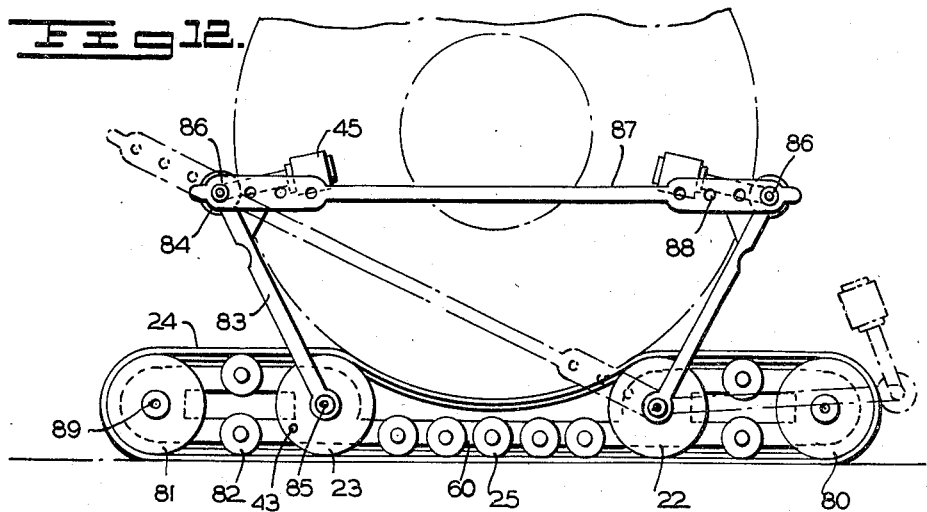
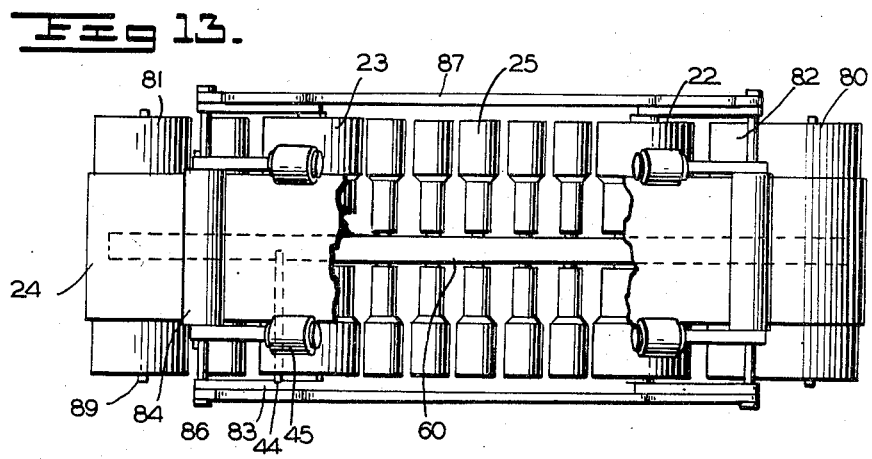
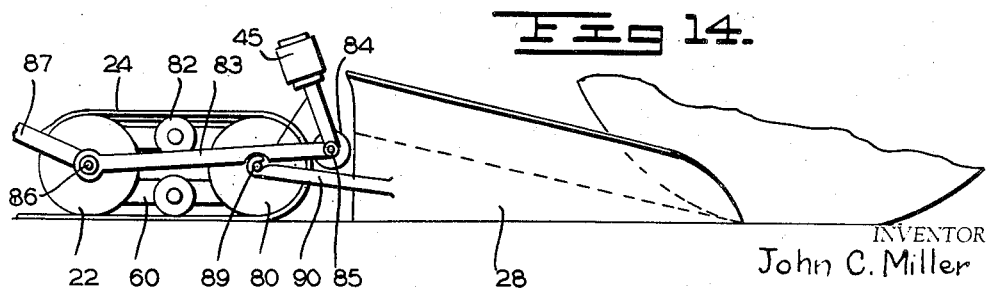

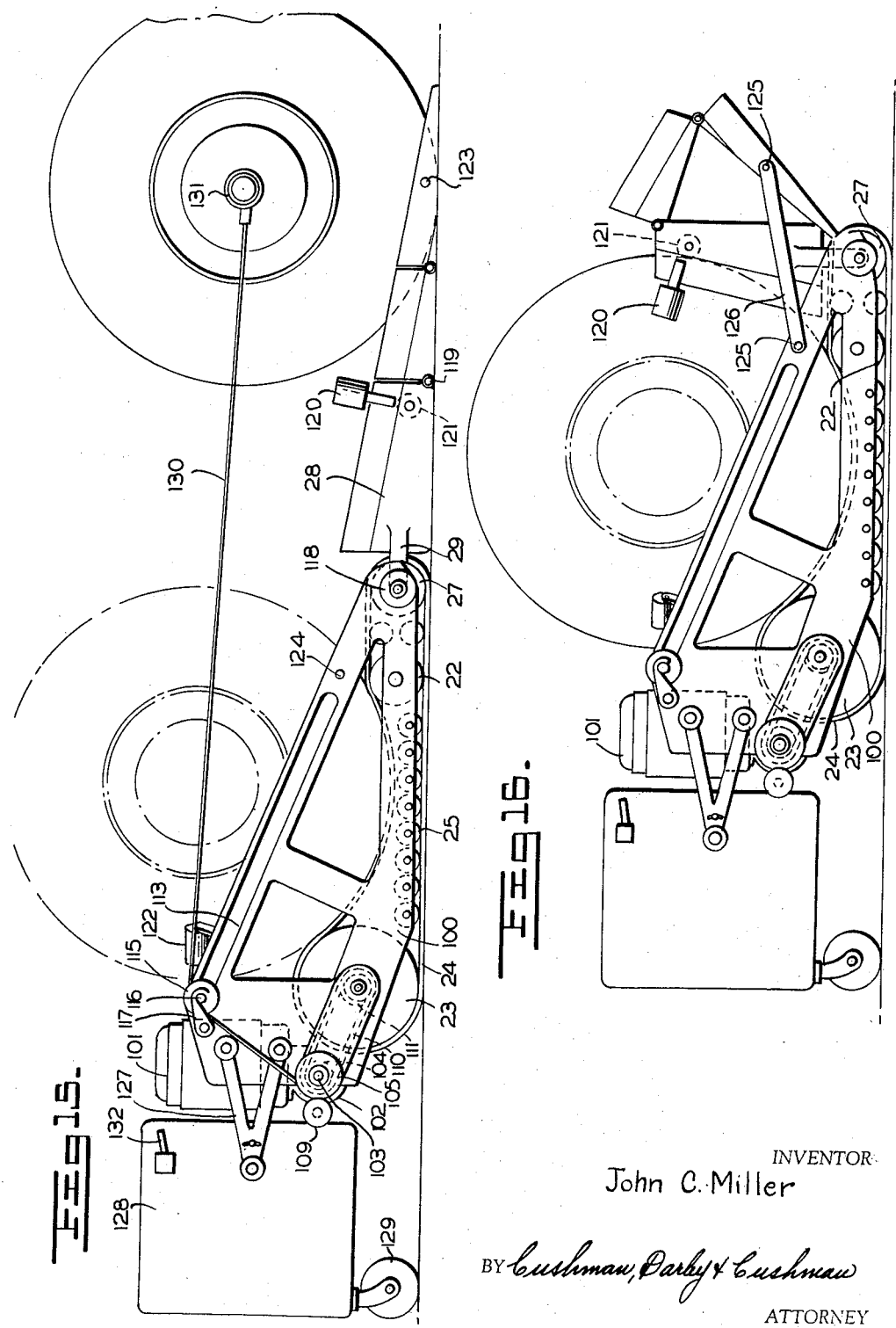

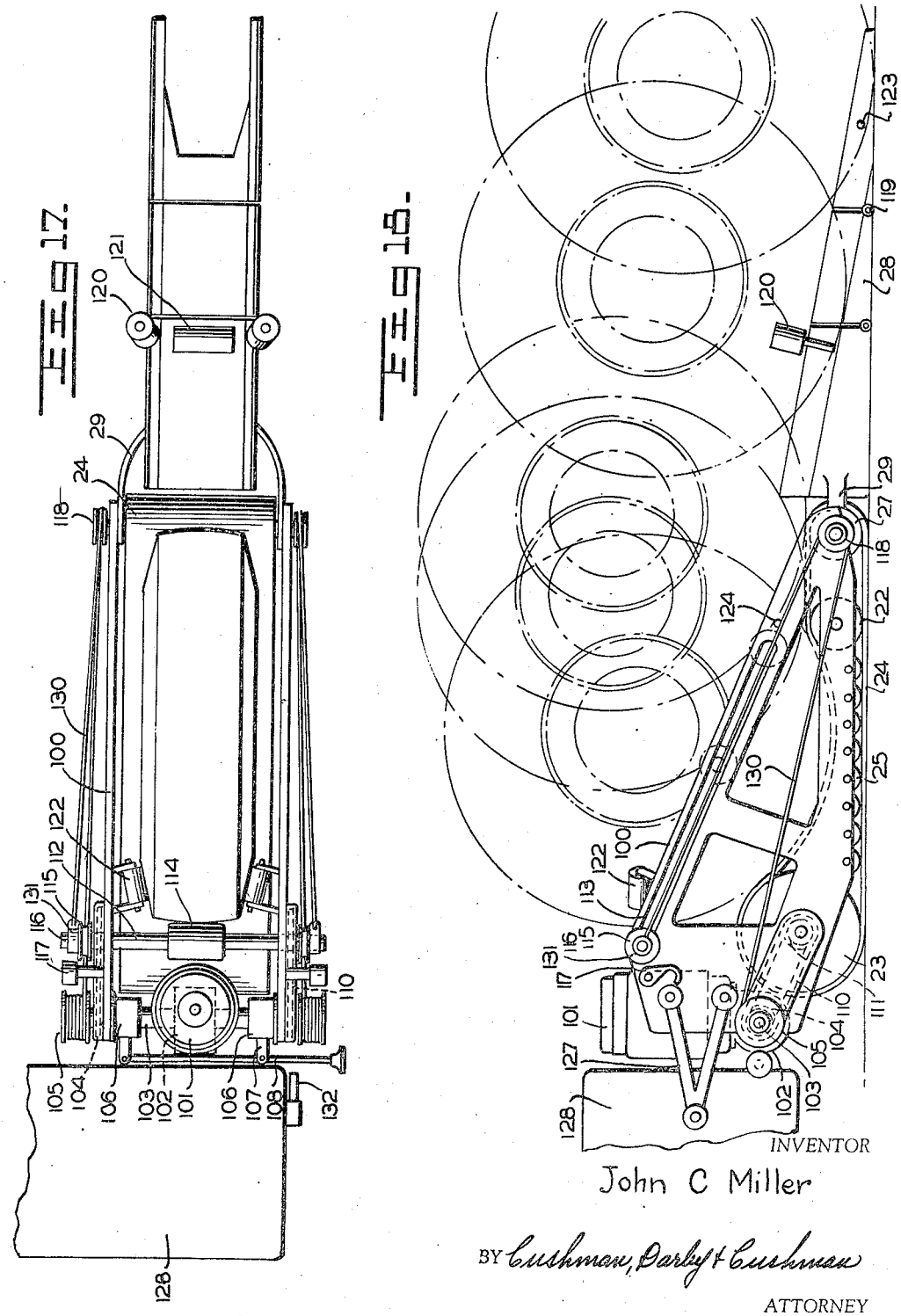

United States Patent Office 2,782,076
Patented Feb. 19, 1957

2,782,076

TRACTION DEVICE

John C. Miller, Schenectady, N. Y.

Application July 17, 1951, Serial No. 237,165

29 Claims. (Cl. 305—3)

This invention relates to traction devices, adapted to support and assist wheeled vehicles in traversing ice, snow, mud, soft sand and the like by greatly increasing the area of contact between wheels and ground, for added traction and flotation. Various embodiments of the invention are adapted for vehicle propulsion by driving supported vehicle wheels, by means of power driving means incorporated in the traction devices, or by utilizing other sources of motive power such as towing vehicles, or in the case of aircraft their main engines driving through propellers.

It is an object of the invention to provide traction devices of small size and light weight, which may be utilized to support and assist very heavy wheeled vehicles over difficult terrain.

Another object of the invention is to provide traction and flotation devices adapted for use entirely under vehicle wheels, onto which the wheels may be readily mounted and later dismounted with equal ease, without any necessity for making mechanical connection thereto or jacking up the vehicle.

Still another object of the invention is to provide a vehicle wheel driven traction device easily and conveniently handled by a single person, particularly adapted for use with automobiles and trucks on ice and snow.

Yet another object is to provide a vehicle wheel-driven traction device adapted to provide increased flotation for the wheel supported thereby, as well as improved traction.

Another object is to provide a device for use entirely under a vehicle wheel, adapted primarily to impart maximum flotation to the supported wheel during movement.

Another object is to provide a powered traction device, and in such a device power means for mounting a wheel thereon and dismounting a wheel therefrom.

Other objects will be in part obvious and in part pointed out hereinafter.

The invention and the novel features thereof may best be made clear from the following description and the accompanying drawings, in which:

Figure 1 is a side elevational view of a simplified embodiment of the invention, with a vehicle wheel mounted thereon;

Figure 2 is a top plan view of the device of Figure 1, with wheel removed and the belt partially broken away to show the inner construction thereof;

Figure 3 is a vertical sectional view of the device of Figure 1 taken on the line 3—3 of Figure 2, but showing the device in unmounted position;

Figures 4 and 5 are vertical sectional views of the device of Figure 1 taken, respectively, substantially along the lines 4—4 and 5—5 thereof;

Figure 6 is a side elevational view of a modified form of the invention, designed for high flotation as well as traction, in wheel supporting position;

Figure 7 is a top plan view of the device of Figure 6, with wheel removed and belt broken away for clarity;

Figure 8 is a vertical sectional view of the ramp end of the device of Figure 6, taken on the line 8—8 of Figure 7, showing the device in unmounted position;

Figures 9 and 10 are vertical sectional views of the device of Figure 6 taken, respectively, substantially along the lines 9—9 and 10—10 thereof;

Figure 11 is a horizontal sectional view of the device of Figure 6 taken substantially on the line 11—11 thereof;

Figure 12 is a side elevational view of another variation of the invention, designed particularly for maximum flotation, showing a wheel mounted thereon;

Figure 13 is a top plan view of the device of Figure 12, with wheel removed and belt partly broken away;

Figure 14 is a partial side elevational view corresponding to Figure 12, but showing the device in wheel mounting and dismounting position;

Figure 15 is a side elevational view of a powered modification of the invention, incorporating mechanism for driving the device and for power mounting and dismounting of vehicle wheels, showing the device arranged for wheel mounting;

Figure 16 is a side elevational view of the embodiment of Figure 15 showing the device in mounted position, ready for movement under its own power;

Figure 17 is a top plan view of the device of Figure 15 arranged for wheel dismounting, and Figure 18 is a side elevational view of the device of Figure 15 arranged for wheel dismounting, illustrating sequentially the dismounting operation.

Referring to the drawings, in Figures 1 to 5 is shown a simplified embodiment of the invention including a frame comprising parallel side frame members 21 and a spaced pair of support rollers 22 and 23 rotatably mounted therebetween. While at least two support rollers are required, three or more may be employed in special applications. A flexible endless belt 24 encircles the support rollers, whereby the assembly rests upon the lower flight of the belt, the outer surface of which is adapted for ground contact. A plurality of idler rollers 25 may be rotatably mounted between frame members 21 intermediate the support rollers, to contact the inner surface of the lower flight of the belt and function as bogies.

Between forward extensions 26 of the frame members is rotatably mounted a lead roller 27, also enclosed by belt 24. A ramp 28 having rearwardly extending ramp arms 29 is pivotally mounted on the lead roller end of the device, conveniently on ends on lead roller 27 protruding through the frame members. Lug plates 30 extend upwardly from frame members 21 adjacent the support roller 22, each supporting a pivot 32 upon which a rocker arm 33 is mounted. The pivots 32 are positioned, in the exemplary embodiment, on an axis above and somewhat to the rear of the leading support roller 22.

Between corresponding ends of rocker arms 33, and also within belt 24, are mounted leading and trailing rocker rollers 34 and 35. Rocker roller 34 is engaged to ramp 28 at a point suitably spaced from its pivotal mounting by means of links 36, and rocker roller 35 is provided with axially extending end pins 37, adapted to engage stop recesses 38 provided in the upper edges of the frame members. A transverse lock rod 39 may be provided in the frame adjacent recesses 38, having pelican hooks 40 extending therefrom adapted to engage end pins 37 and lock the rocker roller 35 in position adjacent the frame. One or both ends of the lock rod is provided with a handle 42, to facilitate manipulation of its hooks.

Preferably, suitable means are incorporated to restrain the device from movement during dismounting of a wheel therefrom. A simple element for this purpose is the bore 43 in the side of support roller 23, adapted for reception of a stop pin 44, as shown in Figure 2. A plurality of side guide rollers 45 are rotatably mounted on rigid arms 46 extending upwardly from the frame members, to prevent relative lateral movement of a wheel 47 mounted on the belt. To insure maintenance of proper alignment of belt 24 with respect to the rollers it encloses, the inner surface of the belt may be provided with integral V-section raised portions 48, adapted to engage aligned grooves 49 in each of the rollers.

Operation of the device illustrated in Figures 1 to 5 will now be described in detail. If a wheel driven vehicle such as an automobile or truck gets stalled on mud, snow or ice, because of inability to get sufficient driving wheel traction for movement, one of the devices of the invention may be placed immediately to the rear of each driving wheel, with its ramp 28 in down position as shown in Figure 3. The device, it will be apparent, is of sufficiently small size and weight to permit easy handling by a single person, and in the case of conventional rear wheel drive vehicles may be readily placed in operative position, with the forward point of the ramp wedged beneath the wheel.

With the traction devices so positioned, the operator may re-enter the vehicle and operate it in reverse direction, whereupon each driving wheel will climb the ramp thereunder, pass over support roller 22 and roll onto the belt 24 of the device, assuming the final mounted position shown in Figure 1. To facilitate the mounting operation, the upper surface of the ramp is preferably of high friction character, and the leading support roller 22 may be of relatively small diameter. As will be readily recognized, when mounted the driving wheel 47 is supported through the belt primarily by the support rollers 22 and 23. The belt length is so selected, desirably, that the portion spanning the supporting rollers materially assists in supporting the driving wheel. If the belt is so loose as not to contact the wheel with sufficient pressure, or so tight as to tend to lift the wheel off the support rollers, the efficiency of the device will be somewhat lowered.

In passing over support roller 22, the vehicle driving wheel 47 acts on the belt to displace the trailing rocker roller 35, and thereby causes rocker arms 33 to rock from the solid line position shown in Figure 3 to the dotted line position of that figure, better shown in Figure 1. The rocking movement of the rocker arms effectively tightens the belt by means of leading rocker roller 34, and through links 36 automatically raises the ramp 28 to an out of the way position whereat it will not interfere with forward movement. Concurrently, trailing rocker roller 35 is moved downwardly until its end pins 37 engage the frame stop recesses 38, and the rocker roller may then be locked in this position by manipulation of lock rod handle 42 to move its pelican hooks 40 into locking engagement with end pins 37. In some cases, the locking means may be omitted, and the wheel alone relied upon to maintain the rocker arms and ramp in desired position.

With its driving wheels mounted on the traction devices, the vehicle may propel itself in forward direction, indicated by arrow 50 in Figure 1, by driving its wheels in normally reverse direction, as indicated by arrow 52. The rear support roller 23 of each device is of sufficiently large diameter to present a substantial obstacle to passage of a wheel thereover, so that rotation of wheel 47 in the indicated direction merely causes movement of the upper flight of belt 24 in the same direction. As will be readily understood, this driving of the upper flight of the belt results in rotation of the belt in contraclockwise direction as shown in Figure 1, whereby the lower flight of the belt propels the device and the supported vehicle in the forward direction of arrow 50. During movement, the side guide rollers 45 function to prevent relative lateral movement of the wheels, and to maintain proper alignment of the traction devices therewith.

The traction device greatly increases the area of bearing surface between the vehicle wheel tire and the surface therebeneath, and multiplies correspondingly the tractive effort exerted by the wheel. In the device illustrated, for example, the bearing surface between belt and road may be seven or eight times the area of normal bearing surface between wheel and road, and by reason of the wrap around between belt and wheel, the area of contact therebetween may be similarly great compared to the normal area of tire surface on the road. Leading rocker roller 34 functions not only to tighten the belt, as previously described, but extends the wrap around between belt and tire, to effect maximum contact therebetween. It will be noted, also, that reverse gear of the vehicle drive is utilized, resulting in smooth, powerful tractive effort.

When the difficult terrain has been negotiated and the traction devices are no longer required, the vehicle may be dismounted therefrom easily and quickly. For this purpose, lock rods 39 may be manipulated to unlock end pins 37 of the trailing rocker rollers 35, and the devices being restrained from movement, the vehicle may be driven forwardly off them, the driving wheels passing over the support rollers 22 and down the ramps, which are automatically lowered by downward movement of the leading rocker rollers 34 transmitted through links 36. To restrain the traction devices from movement, a stop pin 44 may be inserted into the bore 43 of each support roller 23. After partial rotation of the support rollers, the protruding ends of the stop pins will engage side frame members 21, and thereby lock the devices against further movement. Obviously, the stop pins are used only during dismounting of a vehicle from the devices, and are removed when a vehicle is being propelled thereon. When no longer needed, the traction devices may be conveniently stowed. A major advantage of the invention, it will be evident, resides in the ability of the devices to be mounted and dismounted in a minimum of time, without any necessity for jacking up the vehicle or making mechanical connection thereto.

A modification of the invention, designed particularly to give a vehicle greatly increased flotation as well as added traction, is illustrated in Figures 6 to 11. This embodiment is well adapted for use with military and farm vehicles, in traversing mud, soft sand, snow and the like. These vehicles usually omitting fenders and low slung body moulding, greater wrap around between traction device and supported wheel is permitted and utilized, to attain maximum possible traction and flotation.

This embodiment, while resembling in principle and operation the device of Figures 1 to 5, is characterized by a center frame 60 mounting idler rollers 25 along its length, the center mounting of the bogies permitting them to expel mud and snow more easily than if a side frame were employed. From the ends of frame 60 extend yokes 62 and 63, in which the support rollers 22 and 23, respectively, are mounted. From each arm of yoke 63 extends a triangular brace 64, the braces mounting between the apices thereof a lead roller 65 and a contour roller 66. Each brace also carries a side guide roller 45.

The forward support roller 22 is necked down at its center to form a pivotal bearing for an angulated control arm 67, the rear portion of which terminates in end pin 68, while the forward portion is formed at its end into an axle 69 which supports the contour roller 70 and carries at its outer ends side guide rollers 45. The ends of forward support roller 22 constitute pivotal bearings for angulated arms 72, the rear ends of which are joined by transverse control rod 73 and the forward portions of which support between them lead roller 74. The forward portions of arms 72 extend beyond lead roller 74, and the ends thereof rigidly support a ramp 28. Frame 60 is provided with hooks 75 and 76, or equivalent locking devices, positioned and adapted to engage, respectively, end pin 68 of control arm 67 and the control rod 73. Belt 24 encircles the support rollers, idlers, lead rollers and contour rollers, as shown, and is retained in position by its inwardly protruding V-section portions 48 engaged in the roller grooves 49.

As in the previous case, when added traction, flotation or both is required, a unit is positioned immediately to the rear of each driving wheel of the vehicle, with its ramp in the down position illustrated in Figure 8, the ramp ends being wedged in beneath the wheels. The vehicle is then backed up onto the devices, each wheel climbing the ramp therebeneath and passing onto the belt and over the forward support rollers 22, to the final mounted position shown in Figure 6. As each vehicle wheel rolls rearwardly onto the device, it encounters and progressively displaces, through the belt, control arm 67, whereby the control arm is caused to pivot and its contour roller 70 and side guide rollers 45 to follow upwardly behind the wheel, until final mounted position is reached. The dotted line position in Figure 8 illustrates the angular travel of the control arm. In following the wheel, the side guide rollers associated with contour roller 70 serve to maintain alignment of the device with the vehicle wheel throughout the mounting operation, as well as during travel thereon and during dismounting.

Shortly after encountering control arm 67, the mounting wheel engages control rod 73 through the belt and progressively displaces the control rod and arms 72 to final mounted position indicated in dotted lines in Figure 8, whereby lead roller 74 is brought to operative position for forward travel and the ramp is elevated out of the way. The final position of both end pin 68 and control rod 73 is against frame 60, intermediate idler rollers 25, whereat they may be readily engaged and locked in position, respectively, by the hooks 75 and 76. While the locking hooks are desirable for severe working conditions, in some cases they may be omitted and wheel pressure alone relied upon to maintain the end pin 68 and control rod 73 in desired position.

With its driving wheels mounted on the devices, the vehicle may be propelled in forward direction by driving the wheels in reverse, as previously described. In this embodiment, the mounted device is substantially symmetrical fore and aft relative to the supported wheel, so that the device may be utilized and is well adapted to propel the mounted vehicle in either direction. In other words, the supported vehicle may also be driven in reverse direction, by driving the wheels in normally forward direction.

This modification extends far up toward the center of the supported wheel on both sides, and the contour rollers 66 and 70 function to hold the belt firmly against the wheel over a large proportion of its periphery. The lead rollers 65 and 74 serve to facilitate traverse of the device over rough terrain, and maintain portions of the belt immediately fore and aft of the support rollers in near horizontal position, so that these slightly inclined portions contribute to flotation in deep mud, sand, snow and the like, especially during movement. The center frame construction, it will be evident, permits a certain amount of torsional flexibility in the device, which is desirable in this type of service.

When the devices are no longer required, the vehicle may be dismounted therefrom by unlocking hooks 75 and 76 to release control arm 67 and control rod 73, and inserting a stop pin in bore 43 of each support roller 23 to restrain the devices from movement, whereupon the vehicle may be driven forwardly over support rollers 22 and down the ramps.

The foregoing embodiments of the invention are adapted for employment with wheel driven vehicles. Another modification, adapted to provide added flotation for vehicles wheel supported but not wheel driven, is illustrated in Figures 12 to 14. Aircraft, for example, occasionally must leave paved runways and taxi strips, and cross unpaved areas to reach dispersal zones or for similar purposes. To assist heavy aircraft or similar machines in traversing soft ground, a variation of the invention is provided including a center frame member 60 mounting the usual support rollers 22 and 23, and intermediate idler rollers 25. To provide maximum flotation, the frame is extended beyond support rollers 22 and 23 to mount, respectively, lead rollers 80 and 81. The lead rollers are preferably of the same diameter as are the support rollers, and frame-mounted idler rollers 82 are suitably disposed to support the belt portions extending between adjacent support and lead rollers. In this embodiment all the rollers are center mounted on the frame, so as to expel soft material easily from the device.

Each support roller at its ends pivotally mounts a pair of control arms 83, joined at their outer ends by a retainer roller 84 with which is associated a suitably spaced pair of inwardly projecting side guide rollers 45. The ends of support rollers 22 and 23 and the retainer rollers 84 are provided with bores 85 adapted for reception of pins 86, and a pair of links 87 each having a plurality of spaced positioning holes 88 at both ends thereof are provided, whereby the retainer rollers may be rigidly positioned with respect to the opposite support rollers or to each other, alternatively. Obviously, equivalent conventional quick attachment means may be utilized to detachably secure links 87 to the retainer rollers and support rollers, as required. Lead rollers 80 and 81 are provided with projecting end pins 89, by means of which the hooked arms 90 of a ramp 28 may be detachably secured thereto.

In utilizing the flotation devices for the exemplary purpose of moving an aircraft, one may be positioned in front of each main wheel of the aircraft, with a ramp 28 temporarily engaged by its arms 90 to the near lead roller, illustrated as lead roller 80 in Figure 14, the ramp extending therefrom toward and beneath the wheel. The far retainer roller 84 is fixed in raised position by links 87, engaged to the far retainer roller and the near support roller 22 by pins 86, as indicated by dotted lines in Figure 12. With this configuration, the near retainer roller rests out of the way between lead roller 80 and the ramp, as shown in Figure 14. With the devices so disposed, the aircraft may be caused to mount them by using the tractive or propulsive effort of its own power plant, or by towing the aircraft thereonto.

When the wheels of the aircraft mount the ramps onto the devices they assume the final mounted position resting on the belts and support rollers shown in Figure 12, and are prevented from riding past this position by the elevated far retainer roller 84. Because the devices are not driven by the wheels resting thereon, it is not necessary to have a large area of contact therebetween, so that the support rollers may be of relatively smaller diameter and closer together than in the previous cases. Accordingly, the devices are lower overall, and easily mounted. Ramps 28 may next be detached, and the wheels secured on the devices by bringing both retainer rollers 84 up against the peripheries thereof, and locking them together in this position by pinning links 87 therebetween. That is, the pins 86 may be removed to free the links from their former position, and reinserted to position the links as shown in solid lines in Figure 12. The retainer rollers so disposed serve effectively to maintain the wheels on the devices, and the side guide rollers associated therewith prevent relative lateral movement.

The mounted aircraft may now be moved to desired location on the traction devices, by taxiing under its own power or by towing. It will be necessary, of course, that the wheel brakes be unlocked, so that the wheels may turn freely with the rotation of the belts as the devices progress. It is assumed that nose wheel, tail wheel or outrigger wheels will not bear enough weight to require assistance, although obviously they may be similarly mounted on a device if necessary. The flotation devices increase the ground area of contact of each wheel many times, so that soft ground may be readily traversed without miring. If the aircraft is parked on soft ground, it may remain mounted on the devices, ready at any time for movement to another location or back to a paved area.

To dismount the aircraft, the ramps 28 may be manually attached to the forward lead rollers 81, and links 87 detached to permit the forward retainer rollers, extending from support rollers 23, to drop out of the way. The devices may be restrained from movement by suitable chocks, or by means of long stop pins 44 inserted into bores 43 of support rollers 23, whereupon the aircraft may taxi forward off the flotation devices under its own power. As will be evident, the aircraft may be towed onto and off the devices in either direction, it being necessary only to attach the ramps at the proper end and lower the proper retainer rollers.

Still another embodiment of the invention, wherein the traction device itself is power driven, is illustrated in Figures 15 to 18. This modification is particularly useful in applications such as the movement of heavy jet engine driven aircraft, in which the full expenditure for taxiing by means of the aircraft power plants may be prohibitively high, and blast and other hazards may be involved in ground operation. Means are also incorporated in the traction device, preferably, for power mounting and dismounting of wheels onto and from the device.

The powered embodiment may comprise spaced side frame members 100 of substantially triangular shape, mounting between them the support rollers 22 and 23 and the intermediate idler rollers 25 common to the other forms of the invention. Additionally, a lead roller 27 is mounted between the leading ends of the frame members, the lead roller in common with the support and idler rollers being encircled by the usual belt 24. The belt is preferably inwardly configured to assure retention in proper alignment on the rollers, and its outer surface may be conventionally adapted for tractive effort, as by transverse corrugations.

Adjacent the support roller 23, power driving means such as electric motor 101 is vertically mounted on the frame, adapted to drive through reduction gear box 102 the power shaft 103, by means of which power is transmitted alternatively to sprockets 104 or end winches 105. Engagement of the power shaft to sprockets or winches is determined by clutches 106, controlled by arms 107 which in turn are actuated by a common rod 108 extending outwardly to one side of the device and terminating in operating handle 109. Sprockets 104 are drivingly engaged by chains 110 to sprockets 111 fixedly mounted on support roller 23.

Above support roller 23, a cross shaft 112 extends between and through the side frame members, slidably mounted in guide slots 113 thereof, the cross shaft bearing a central contact roller 114, freely rotatable sheaves 115 adjacent its ends outside the frame, and terminating in end portions 116. The end portions of the cross shaft are adapted to be engaged and locked in uppermost position by hooks 117, suitably mounted on the outside of the frame. The slots 113, as shown, constitute extended guides defining an inclined path above the support rollers.

The lead roller 27 is also provided with freely rotatable end sheaves 118, and pivotally mounted on the lead roller by means of arms 29 is a three section, folding ramp 28, the ramp sections being joined by hinges 119. The innermost section of the ramp mounts side guide rollers 120 and a center contact roller 121, and side guide rollers 122 are provided on the upper edges of the frame members at a position adjacent the high end position of the cross shaft. The outermost ramp section is drilled at 123 and the side frame members at 124 for reception of pins 125, by means of which the ramp may be locked in elevated, folded position through detachable links 126, as shown in Figure 16.

The end of the device opposite the ramp is provided with outwardly extending arms 127, by means of which it may be detachably secured to a portable source of power such as the motor-generator set 128, mounted on castering wheels 129. Cables 130 are provided in association with winches 105, the cables terminating in end collars 131 which are utilized in mounting or dismounting a wheel on the device as hereinafter described.

The motor-generator set 128 may include a conventional gasoline engine of suitable power, driving two or more generators. The motor of each traction device to be utilized is connected preferably to an individual generator by a flexible conduit 132, and an additional generator may be provided to furnish power for aircraft equipment while associated with the devices, thereby facilitating starting of main engines, test of electronic and navigation equipment, and the like. Primarily for this reason, the generators and traction device driving motors are preferably of high amperage, low voltage, direct current design.

In utilizing the powered traction devices, illustratively to move an aircraft, two of them may be attached to opposite sides of the motor-generator set, and the set operated to furnish power for and drive the support rollers 23 of the devices, to propel the assembly to the vicinity of the aircraft. For this purpose the wheels 129 of the motor-generator set may be locked against castering and engaged by conventional steering mechanism, and the assembly guided in this manner by an operator seated atop the set. Obviously, for propulsion of the devices, the clutches 106 must engage sprockets 104 to the power shafts 103.

When ready to mount the aircraft, one traction device may be mechanically disconnected from the motor-generator set, and maneuvered into place immediately forward of one main wheel of the aircraft, with the ramp extended and wedged beneath the wheel. The traction device will remain electrically connected to the motor-generator set by its flexible conduit. The other traction device and the motor-generator set as a unit may be steered into position forward of the other main wheel of the aircraft, as illustrated in Figure 15.

The cross shafts of the devices being locked in uppermost position by hooks 117, the cables 130 are run from winches 105 over sheaves 115 to the sides of each wheel, and connected by means of collars 131 to the wheel hub or suitable pins mounted therein for the purpose. Handles 109 may next be displaced to move rods 108, whereby the clutches 106 are actuated to disengage the power shaft 103 of each device from sprockets 104 and engage the power shaft to the winches. Now upon starting the motors 101, the cables will wind upon the winches pulling the wheels up the ramp and onto the belts, over the smaller diameter support rollers 22 to the final position indicated in dotted lines in Figure 15, the wheels being stabilized in this position by the cross shaft contact rollers 114 and the side guide rollers 122 (see Figure 17). The ramps may now be folded and locked in elevated position by suitable means such as links 126, retained by pins 125 inserted through the links into holes 123 and 124. So folded and locked, the ramps serve to insure retention of the wheels on the devices by means of their contact rollers 121 and side guide rollers 122.

Each main wheel of the aircraft being mounted on a traction device, the clutches may be reversed to engage the power shafts to the driving sprockets, and the motors 101 controlled to move the mounted aircraft as desired. The motor controls may be conveniently mounted on the motor-generator set, or preferably are connected by means of flexible cables, so that the aircraft may be guided by an operator walking alongside, or by the pilot of the craft seated in the cockpit. The aircraft mounted on the traction devices is highly maneuverable, since the devices may be individually controlled. The traction devices may be operated in forward direction or reverse, at equal or different speeds, together or differentially, so that the aircraft may be freely maneuvered and guided. The motor-generator set remaining linked to one traction device, by releasing its wheels for free castering it will be propelled by and with the associated traction device.

The use of electric drive results in smooth control, whereby no undue strain is placed on the aircraft landing gear. As in the previous case, the aircraft wheels must be unbraked, so as to free wheel on the supporting devices.

Mounting the aircraft on the traction devices greatly increases the bearing surface of the main wheels and distributes their load, so that the aircraft may move easily over lightly constructed taxi strips and the like without damage thereto, and without bogging down. While the devices are relatively light in weight, with an aircraft mounted thereon they exert great tractive effort, utilizing as they do the weight of the aircraft itself for this purpose. When desired location is reached, the aircraft may be dismounted or permitted to remain mounted on the devices. In the latter case, the motor-generator set may be disconnected and employed elsewhere. In resting on the devices, approximately 80° of the periphery of each wheel tire contacts the belt therebeneath, distributing the bearing load widely, so that there is no tendency to form a flat spot on the tire, a feature particularly advantageous in cold weather.

The traction devices of this embodiment may also utilize their own power drive to dismount wheels therefrom. The dismounting set-up and operation is illustrated in Figure 18, wherein it will be seen that the cables 130 are led from winches 105 below and around the sheaves 118, and thence to the cross shaft 112, to the end portions 116 of which they are engaged by means of collars 131. The ramps are unlocked by removal of links 126 and unfolded to extended position, and the hooks 117 are manipulated to unlock cross shafts 112. Thereupon, on starting motors 101, winches 105 will wind cables 130 and by means of the cables displace the cross shafts downwardly along slots 113. The contact roller 114 on each cross shaft bears laterally and slightly upwardly against the wheel as the cross shaft moves, forcing the wheel progressively over support roller 22 and the horizontal belt portion outward thereof, as sequentially illustrated by the several dotted line positions of the wheel in Figure 18.

When the cross shaft reaches the limit of its travel, at the lower end of slots 113, its contact roller 114 has caused the wheel to clear lead roller 27 and roll onto the ramp, and thereafter the wheel rolls down and off the ramp under the influence of gravity. The cables may be disconnected from the cross shaft and wound upon the winches, the cross shaft returned to uppermost position and locked, the ramp folded and elevated out of the way, and the traction device is ready for removal to another location and further use.

While electrical drive for this modification is preferred, it will be understood that other power driving means may be empolyed. Each traction device, for example, may be provided with an individual gasoline engine or other conventional power source.

It will thus be seen that there have been provided by this invention structures in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A traction device for supporting a vehicle wheel in driving engagement without direct connection thereto comprising a frame, two spaced wheel support rollers mounted on said frame, an endless belt closely encircling said support rollers whereby the assembly rests on the lower flight of the belt, and frame mounted wheel engaging means adapted to prevent relative longitudinal displacement of a wheel mounted on said support rollers.

2. A traction device for supporting a vehicle wheel in driving engagement without direct connection thereto comprising a frame, two spaced wheel support rollers mounted on said frame, an endless belt closely encircling said support rollers whereby the assembly rests on the lower flight of the belt, a ramp pivotally mounted at one end of the frame to facilitate mounting a wheel onto said support rollers, and frame mounted wheel engaging means adapted to prevent relative longitudinal displacement of a wheel mounted on said support rollers.

3. A traction device comprising a frame, two spaced wheel support rollers mounted on said frame, an endless belt encircling said support rollers whereby the assembly rests upon the lower flight of the belt, a ramp pivotally mounted at one end of the frame to facilitate mounting a wheel onto said support rollers above the upper flight of the belt, and means responsive to movement of a wheel onto said support rollers to elevate said ramp.

4. A traction device comprising a frame, two spaced wheel support rollers mounted on said frame, an endless belt encircling said support rollers whereby the assembly rests upon the lower flight of the belt, a ramp pivotally mounted at one end of the frame to facilitate mounting a wheel onto said support rollers above the upper flight of the belt, means responsive to movement of a wheel onto said support rollers to tighten the belt and elevate the ramp, and means for preventing lateral movement of a wheel mounted on said support rollers.

5. A traction device comprising a frame, two spaced wheel support rollers of different diameter mounted on said frame, a lead roller mounted on the frame outside the smaller diameter support roller, an endless belt encircling said support rollers and lead roller whereby the assembly rests upon the lower flight of the belt, a ramp pivotally mounted on the lead roller end of the device to facilitate mounting a wheel onto said support rollers above the upper flight of the belt, means responsive to movement of a wheel onto the belt above said support rollers to elevate said ramp, means for preventing lateral movement of a wheel mounted on said support rollers, and means for restraining the device from movement during dismounting of a wheel therefrom.

6. A traction device comprising a frame, two spaced wheel support rollers of different diameter mounted on said frame, a lead roller mounted on the frame outside the smaller diameter support roller, an endless belt encircling said support rollers and lead roller whereby the assembly rests upon the lower flight of the belt, a ramp pivotally mounted on the lead roller end of the device to facilitate mounting a wheel onto said support rollers above the upper flight of the belt, means responsive to movement of a wheel onto the belt above said support rollers to tighten the belt and elevate the ramp, means for preventing lateral movement of a wheel mounted on said support rollers, and means for preventing rotation of one of said support rollers during dismounting of a wheel from the device.

7. A traction device comprising a frame, two spaced wheel support rollers of different diameter mounted on said frame, a plurality of idler rollers mounted on said frame intermediate said support rollers, a lead roller mounted on the frame outside the smaller diameter support roller, an endless belt encircling said support rollers, idler rollers and lead roller whereby the assembly rests upon the lower flight of the belt, a ramp pivotally mounted on the lead roller end of the device to facilitate mounting a wheel onto said support wheels above the upper flight of the belt, means responsive to movement of a wheel onto the belt above said support rollers to tighten the belt and elevate the ramp, means for locking said wheel-responsive means in belt tightening position, means for preventing lateral movement of a wheel mounted on said support wheels, and means for restraining the device from movement during dismounting of a wheel therefrom.

8. A traction device according to claim 7, wherein said wheel-responsive means comprises a rocker arm pivotally mounted on the frame, said arm bearing contact members disposed within the belt on opposite sides of the smaller support roller, and said arm being linked to the ramp at a point spaced from its pivotal axis.

9. A traction device including a frame member, two spaced wheel support rollers mounted on said frame member, a lead roller rigidly associated with one of said support rollers, a lead roller pivotally mounted in association with the other of said support rollers, an endless belt encircling said support rollers and lead rollers whereby the assembly rests upon the lower flight of the belt, a ramp associated with the pivotally mounted lead roller to facilitate mounting a wheel onto said support wheels above the upper flight of the belt, means responsive to movement of a wheel onto the belt to elevate the pivotally mounted lead roller, and means for preventing lateral movement of a wheel mounted on said support wheels.

10. A traction device according to claim 9, including means for preventing rotation of one of said support rollers during dismounting of a wheel from the device.

11. A traction device comprising a frame member, two spaced wheel support rollers mounted on said frame member, a lead roller and a contour roller rigidly associated with one of said support rollers, a lead roller and a contour roller pivotally mounted in association with the other of said support rollers, an endless belt encircling said support rollers, lead rollers and contour rollers whereby the assembly rests upon the lower flight of the belt, a ramp associated with the pivotally mounted lead roller to facilitate mounting a wheel onto said support wheels above the upper flight of the belt, means responsive to movement of a wheel onto the belt above said support rollers to elevate the pivotally mounted lead and contour rollers, means for preventing lateral movement of a wheel mounted on said support rollers, and means for restraining the device from movement during dismounting of a wheel therefrom.

12. A traction device comprising a frame member, two spaced wheel support rollers mounted on said frame member, a plurality of idler rollers center mounted on said frame member intermediate said support rollers, a lead roller and a contour roller rigidly associated with one of said support rollers, a lead roller and a contour roller pivotally mounted in association with the other of said support rollers, an endless belt encircling said support rollers, idler rollers, lead rollers and contour rollers whereby the assembly rests upon the lower flight of the belt, a ramp associated with the pivotally mounted lead roller to facilitate mounting a wheel onto said support wheels above the upper flight of the belt, means responsive to movement of a wheel onto the belt above said support rollers to elevate the pivotally mounted lead and contour rollers, whereby the belt is tightened and the ramp is elevated, means for locking said wheel-responsive means in belt tightening position, side guide rollers associated with each contour roller to prevent lateral movement of a wheel mounted on said support rollers, and means for restraining the device from movement during dismounting of a wheel therefrom.

13. A traction device according to claim 12, wherein said wheel-responsive means comprises individual control members rigidly connected to said pivotally mounted lead and contour rollers and extending under the upper flight of the belt to a position intermediate the support rollers.

14. A traction device for supporting a vehicle wheel in driving engagement without direct connection thereto comprising a frame member, two spaced wheel support rollers mounted on said frame member, a plurality of idler rollers center mounted on said frame member intermediate said support rollers, a lead roller rigidly mounted in association with one of said support rollers, an endless belt closely encircling said support rollers, idler rollers and lead roller whereby the assembly rests upon the lower flight of the belt, means for preventing lateral movement of a wheel mounted on said support rollers, and means for restraining the device from movement during dismounting of a wheel therefrom.

15. A traction device for supporting a vehicle wheel in driving engagement without direct connection thereto comprising a frame member, two spaced wheel support rollers mounted on said frame member, a plurality of idler rollers center mounted on said frame member intermediate said support rollers, a lead roller mounted on said frame member outside each support roller, an endless belt closely encircling said support rollers, idler rollers and lead rollers whereby the assembly rests upon the lower flight of the belt, a control arm pivotally associated with each support roller, a control member associated with the outer end of each control arm, link means, means associated with both ends of said control arms adapted for ready attachment thereto of said link means whereby the position of said control members may be fixed relative to each other and to said support rollers, and means for preventing lateral movement of a wheel mounted on said support rollers.

16. A traction device for supporting a vehicle wheel in driving engagement without direct connection thereto comprising a frame member, two spaced wheel support rollers center mounted on said frame member, a plurality of idler rollers center mounted on said frame member intermediate said support rollers, a lead roller center mounted on said frame member outside each support roller, an endless belt closely encircling said support rollers, idler rollers and lead rollers whereby the assembly rests upon the lower flight of the belt, a control arm pivotally associated with each support roller, a retainer roller associated with the outer end of each control arm, link means, means associated with both ends of said control arms adapted for ready attachment thereto of said link means whereby the position of said retainer rollers may be fixed relative to each other and to said support rollers, and means associated with each lead roller adapted for ready attachment of a ramp thereto.

17. A traction device comprising a frame, two spaced wheel support rollers of different diameter mounted in said frame, a plurality of idler rollers mounted in the frame intermediate said support rollers, a lead roller mounted in the frame outside the smaller diameter support roller, an endless belt encircling the support rollers, idler rollers and lead roller whereby the assembly rests upon the lower flight of the belt, a ramp pivotally mounted on the frame adjacent the smaller diameter support roller to facilitate mounting a wheel onto said support rollers above the upper flight of the belt, and means for preventing lateral movement of a wheel mounted on said support rollers.

18. A traction device for supporting a vehicle wheel in driving engagement without direct connection thereto comprising a frame, two spaced wheel support rollers mounted on said frame, an endless belt closely encircling said support rollers whereby the assembly rests on the lower flight of the belt, frame mounted means preventing relative positional displacement of a wheel mounted on said support rollers, and power means for driving one of said support rollers.

19. A traction device for supporting a vehicle wheel in driving engagement without direct connection thereto comprising a frame including spaced wheel side members, two spaced support rollers mounted transversely in said frame, an endless belt closely encircling said support rollers whereby the assembly rests upon the lower flight of the belt, means for driving one of said support rollers, extended guide means in the frame defining a path above said support rollers, a cross shaft slidably mounted in said guide means, means for releasably locking said cross shaft in one end position, a winch mounted on the frame adjacent the locking end position of said cross shaft, a sheave associated with the cross shaft, and a sheave associated with the frame adjacent the non-locking end position of the cross shaft.

20. A traction device according to claim 19, including a ramp pivotally mounted on the frame adjacent the non-locking end position of the cross shaft.

21. A traction device for supporting a vehicle wheel in driving engagement without direct connection thereto comprising a frame including spaced wheel side members, two spaced support rollers mounted transversely in said frame, an endless belt closely encircling said support rollers whereby the assembly rests upon the lower flight of the belt, means for driving one of said support rollers, extended guide means in the frame defining an inclined path above said support rollers, a cross shaft slidably mounted in said guide means, means for releasably locking said cross shaft in high end position, a winch mounted on the frame adjacent the high end position of said cross shaft, means for driving said winch, a sheave associated with said cross shaft, and a sheave associated with the frame adjacent the low end position of the cross shaft.

22. A traction device according to claim 21, including a hinged ramp pivotally mounted on the frame adjacent the low end position of the cross shaft, and means for releasably retaining said ramp in elevated folded position.

23. A traction device for supporting a vehicle wheel in driving engagement without direct connection thereto comprising a frame including spaced wheel side members, two spaced support rollers of different diameter mounted transversely in said frame, an endless belt closely encircling said support rollers whereby the assembly rests upon the lower flight of the belt, means for driving the larger diameter support roller, a winch mounted on the frame adjacent the larger diameter support roller, means for driving said winch, extended guide means in the frame defining a path above said support rollers, a cross shaft slidably mounted in said guide means, means for releasably locking said cross shaft in end position adjacent the larger diameter support roller, a sheave associated with said cross shaft, and a sheave associated with the frame adjacent the smaller diameter support roller.

24. A traction device for supporting a vehicle wheel in driving engagement without direct connection thereto comprising a frame including spaced wheel side members, two spaced support rollers of different diameter mounted transversely in said frame, an endless belt closely encircling said support rollers whereby the assembly rests upon the lower flight of the belt, means for driving the larger diameter support roller, a winch mounted on the frame adjacent the larger diameter support roller, means for driving said winch, extended guide means in the frame defining an inclined path above said support rollers with the high end of said path adjacent the larger diameter support roller, a cross shaft slidably mounted in said guide means, means for releasably locking said cross shaft in high end position, a sheave associated with said cross shaft, a sheave associated with the frame adjacent the smaller diameter support roller, and a ramp pivotally mounted on the frame adjacent the smaller diameter support roller.

25. A traction device for supporting a vehicle wheel in driving engagement without direct connection thereto comprising a frame including spaced wheel side members, two spaced support rollers mounted transversely in said frame, an endless belt closely encircling said support rollers whereby the assembly rests upon the lower flight of the belt, power driving means mounted on the frame adjacent one of said support rollers, a winch mounted on the frame adjacent said power driving means, means engaging said power driving means alternatively to said winch and the adjacent support roller, extended guide means in the frame defining a path above said support rollers, a cross shaft slidably mounted in said guide means, means for releasably locking said cross shaft in end position adjacent said power driving means, a sheave associated with said cross shaft, and a sheave associated with the frame adjacent the nonlocking end position of the cross shaft.

26. A traction device for supporting a vehicle wheel in ing engagement without direct connection thereto comprising a frame including spaced wheel side members, two spaced support rollers of different diameter mounted transversely in said frame, an endless belt closely encircling said support rollers whereby the assembly rests upon the lower flight of the belt, power driving means mounted on the frame adjacent the larger diameter support roller, a winch mounted on the frame adjacent the larger diameter support roller, means engaging said power driving engagement without direct connection thereto comdiameter support roller, extended guide means in the frame defining an inclined path above said support rollers with the high end of said path adjacent the larger diameter support roller, a cross shaft slidably mounted in said guide means, means for releasably locking said cross shaft in high end position, a sheave associated with said cross shaft, and a sheave associated with the frame adjacent the smaller diameter support roller.

27. A traction device according to claim 26, including a hinged ramp pivotally mounted on the frame adjacent the smaller diameter support roller, and means for releasably retaining said ramp in elevated folded position.

28. A traction device for supporting a vehicle wheel in driving engagement without direct connection thereto comprising a frame including spaced wheel side members, two spaced support rollers of different diameter mounted transversely in said frame, a plurality of idler rollers mounted in said frame intermediate said support rollers, a lead roller mounted transversely in said frame outside the smaller diameter support roller, an endless belt closely encircling said support rollers, idler rollers and lead roller whereby the assembly rests upon the lower flight of the belt, means for driving the larger diameter support roller, a winch mounted on the frame adjacent the larger diameter support roller, means for driving said winch, extended guide means in the frame defining a path above said support rollers, a cross shaft slidably mounted in said guide means, means for releasably locking said cross shaft in end position adjacent the larger diameter support roller, an end sheave on said cross shaft, an end sheave on said lead roller, a cable associated with said winch, the end of said cable being adapted to engage an end of said cross shaft, a ramp pivotally mounted on said lead roller, and means for releasably retaining said ramp in elevated position.

29. A traction device for supporting a vehicle wheel in driving engagement without direct connection thereto comprising a frame including spaced wheel side members, two spaced support rollers of different diameter mounted transversely in said frame, an endless belt closely encircling said support rollers whereby the assembly rests upon the lower flight of the belt, an electric motor mounted on the frame adjacent the larger diameter support roller, a winch mounted on the frame adjacent the larger diameter support roller, means engaging said motor alternatively to said winch and the larger diameter support roller, extended guide means in the frame defining an inclined path above said support rollers with the high end of said path adjacent the larger diameter support roller, a cross shaft slidably mounted in said guide means, means for releasably locking said cross shaft in high end position, a sheave associated with said cross shaft, a sheave associated with the frame adjacent the smaller diameter support roller, and means for detachably engaging said frame to a mobile source of power.

References Cited in the file of this patent

UNITED STATES PATENTS

| | | |
|---|---|---|
| 1,132,862 | Montine | Mar. 23, 1915 |
| 1,329,084 | Kees et al. | Jan. 27, 1920 |
| 1,566,085 | Geaudreau | Dec. 15, 1925 |
| 1,699,882 | Ferguson | Jan. 22, 1929 |
| 1,914,098 | Bean | June 13, 1933 |
| 1,966,866 | Miller | July 17, 1934 |
| 2,067,400 | Koplin et al. | Jan. 12, 1937 |
| 2,556,270 | Groeller | June 12, 1951 |
| 2,569,050 | Gref et al. | Sept. 25, 1951 |
| 2,573,728 | Pugh | Nov. 6, 1951 |

FOREIGN PATENTS

| | | |
|---|---|---|
| 713,105 | France | Aug. 10, 1931 |
| 241,807 | Switzerland | Aug. 1, 1946 |